Dec. 13, 1960 T. O. STANLEY 2,964,673

TRANSISTOR DEFLECTION CIRCUIT

Filed Sept. 3, 1958 2 Sheets-Sheet 1

INVENTOR.
THOMAS O. STANLEY
BY
W. H. Sprague
ATTORNEY

Dec. 13, 1960 T. O. STANLEY 2,964,673

TRANSISTOR DEFLECTION CIRCUIT

Filed Sept. 3, 1958 2 Sheets-Sheet 2

INVENTOR
THOMAS O. STANLEY
BY
W. H. Sprague
ATTORNEY

United States Patent Office 2,964,673

Patented Dec. 13, 1960

2,964,673

TRANSISTOR DEFLECTION CIRCUIT

Thomas O. Stanley, Princeton, N.J., assignor to Radio Corporation of America, a corporation of Delaware Filed Sept. 3, 1958, Ser. No. 758,760

21 Claims. (Cl. 315—26)

Figure 1:
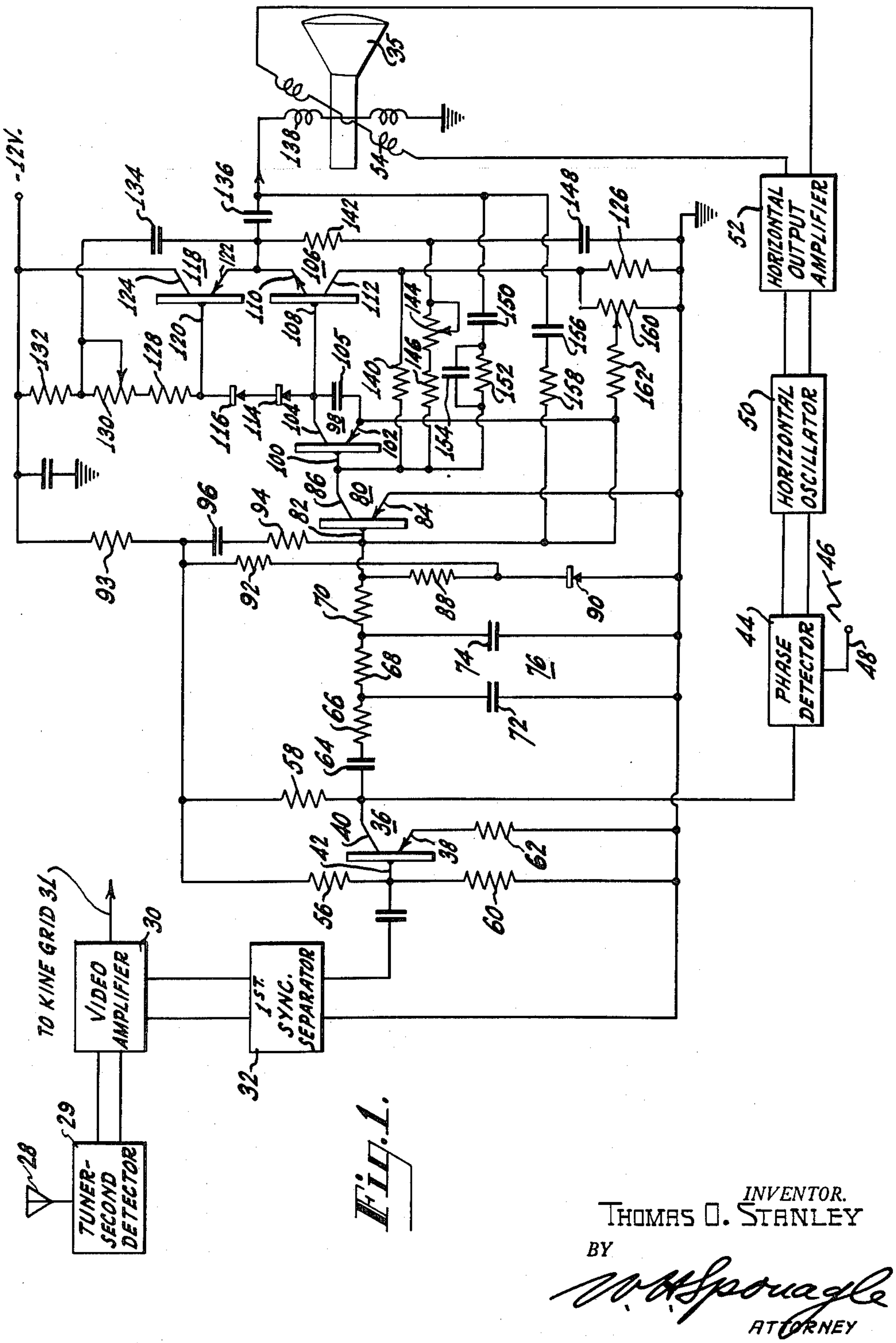

This invention relates to circuits suitable for deflecting the kinescope electron beam of television receivers and the like and in particular to television vertical deflection circuits using transistors.

Deflection circuits for television receivers are normally relatively inefficient. Inefficiency can be tolerated in television receivers which use electron tubes since a considerable amount of power is available. The power available in transistor television receivers, particularly of the portable type, is limited. Thus, the efficiency of the individual transistor circuits is of prime importance. This is particularly true of the deflection circuits, in which a considerable amount of power is normally dissipated.

The deflection circuits of television receivers are normally synchronized by applying synchronizing pulses to them. In the case of the vertical deflection circuits, the vertical synchronizing or "sync" pulses are derived from a sync separator and applied to the first stage tube or transistor of the deflection circuit. During the periods between sync pulses there is a danger that the deflection circuits will be triggered by received noise pulses. It is, therefore, important that the deflection circuits be immune to false triggering by received noise pulses.

Most vertical deflection circuits use an output transformer or autotransformer or one or more inductors. Transformers and inductors are relatively expensive. In addition, and of just as much importance in transistor receivers, these circuit elements are of considerable weight and are bulky. Thus their use is not desirable.

It is an object of this invention to provide an improved transistor circuit suitable for deflecting the kinescope electron beam of a television receiver.

It is another object of the present invention to provide an improved and relatively efficient television vertical deflection transistor circuit.

It is yet another object of the present invention to provide an improved television transistor vertical deflection circuit which is immune to received noise signals.

It is a further object of this invention to provide, without the need for transformers or inductors, an improved transistor circuit for deflecting the electron beam of a television kinescope.

An improved transistor deflection circuit embodying the invention includes a driver transistor which is connected to drive a class B push-pull output stage comprising a pair of transistors of opposite conductivity types. The output transistors are capacitively coupled to the deflection winding of a television receiver. To provide current flow of sawtooth waveform through the deflection winding, the driver and output transistors are connected to integrate a control signal which is applied to the driver transistor. This control signal is supplied by a sync responsive discharge transistor. Noise immunity is provided by precisely gating the discharge transistor in response to gating voltages developed in the push-pull output stage.

Figure 2:
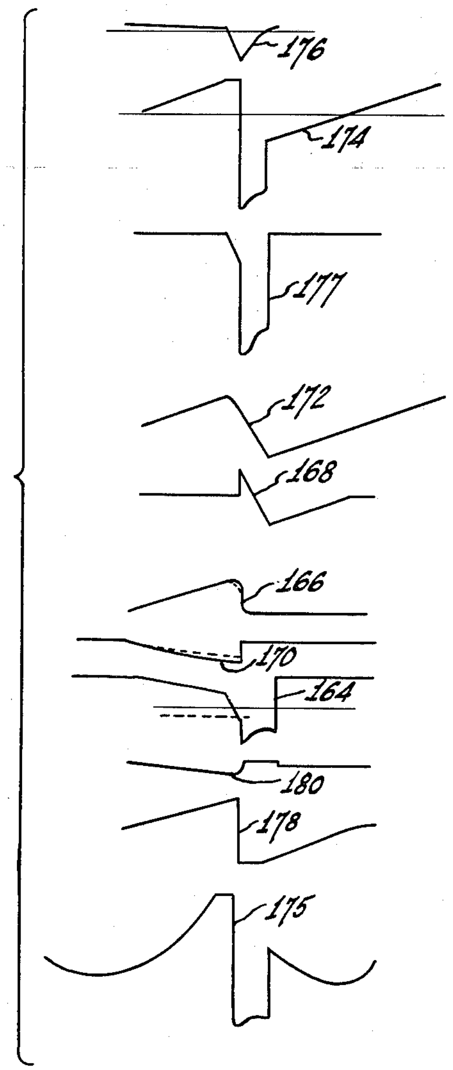

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

Figure 1 is a schematic circuit diagram, partially in block diagram form, of a television receiver embodying the invention; and Figure 2 is a graph which illustrates various current and voltage waveforms for a circuit of the type shown in Figure 1.

Referring now to the drawing, and in particular to Figure 1 thereof, a television receiver includes an antenna 28 which receives composite television signals and couples the received signals to a tuner-second detector 29. The tuner-second detector 29 would normally include, as is conventional, a radio frequency amplifier and/or a frequency converter for converting the radio frequency signals to intermediate frequency signals, an intermediate frequency amplifier, and a detector for deriving the composite television signals from the intermediate frequency signals. The composite television signal is amplified by a video amplifier 30 and derived from an output lead 31. The amplified composite signal is conventionally applied to the control grid (not shown) of a television kinescope 35. The composite television signals are also applied to a first sync separator circuit 32, which is connected with the video amplifier 30. The first sync separator circuit 32 supplies vertical synchronizing pulses to a second sync separator circuit which includes a transistor 36, the base and emitter electrodes of which are connected with the output terminals of the first sync separator circuit 32.

The second sync separator transistor 36, which is illustrated as being of the P–N–P junction type, includes an emitter 38, a collector 40, and a base 42. Biasing voltages are applied to the transistor 36 by connecting its base 42 and collector 40 electrodes through respective resistors 56 and 58 to a negative supply of direct current energizing potential such as a battery (not shown). The base 42 is also connected to ground through a resistor 60 which forms, in combination with the resistor 56, a voltage divider for fixing the base voltage of the transistor 36. The emitter 38 of this transistor is connected to ground through a degenerative stabilizing resistor 62. The collector 40 is connected to the phase detector 44. Accordingly, horizontal sync pulses at the collector 40 are applied to the phase detector 44. The horizontal sync pulses are compared in phase with a sawtooth reference waveform 46, which is applied to the phase detector 44 through the lead 48. The sawtooth reference wave may be derived from a horizontal deflection oscillator 50, for example. Alternatively, this sawtooth voltage may be provided by the integration of horizontal fly-back pulses. The error voltage developed by the comparison of the sync pulses with the sawtooth reference wave is applied to the horizontal oscillator 50 to synchronize it with the horizontal sync pulses.

The signals generated by the horizontal oscillator 50 are applied to a horizontal output amplifier 52. The output terminals of the horizontal output amplifier 52 are connected to the horizontal deflection yoke winding 54. It is to be understood that the horizontal output amplifier 52 may be of any well-known type. Preferably, however, it will use a transistor operated as a switch. With a circuit of this latter type, the transistor switch is forward biased during trace to provide current flow through the horizontal deflection winding 54. This current increases in a linear manner. Pulses from the horizontal oscillator 50 turn the transistor switch off during retrace to discharge the energy stored in the horizontal winding 54.

The collector 40 of the sync separator transistor 36 is also coupled through a coupling capacitor 64 and three series resistors 66, 68, and 70 to the base electrode 82 of a vertical discharge transistor 80. The resistors 66 and 68, together with capacitors 72 and 74, comprise an integrating network 76 for integrating the vertical synchronizing pulses. The capacitor 72 is connected from the junction of the resistors 66 and 68 to ground, while the capacitor 74 is connected from the junction of the resistor 68 and the isolating resistor 70 to ground. The integrating network 76 provides integrated sync pulses of negative polarity on the base 82 of the discharge transistor 80 of the form shown by the graph 176 in Figure 2.

The discharge transistor 80, which may also be considered to be of the P–N–P junction type includes, in addition to the base 82, an emitter 84 and a collector 86. The emitter 84 is directly connected to ground. The base 82 is connected through a resistor 88 and a semi-conductor diode 90 to ground. The diode 90 provides a temperature responsive bias voltage for the base-emitter circuit of the discharge transistor 80. To provide a bias voltage for the base electrode 82 and forward bias for the diode 90, the junction of the diode 90 and the resistor 88 is connected through a resistor 92 and a decoupling resistor 93 to the negative direct current supply terminal (−12 v.). To insure proper starting of the vertical deflection circuit when the television receiver is turned on, the base of the discharge transistor is connected through a resistor 94, a capacitor 96 and the decoupling resistor 93 to the supply source.

The collector 86 or output electrode of the discharge transistor 80 is connected directly with the base 100 of a driver transistor 98, which is also illustrated, by way of example, as being of the P–N–P junction type. The driver transistor 98 includes, in addition to the base 100, an emitter 102 and a collector 104. The emitter 102 of the driver transistor is connected directly to ground, while the collector 104 is connected directly to the base electrode 108 of one transistor 106 of a pair of output transistors 106 and 118. To prevent high frequency oscillations or ringing a capacitor 105, which reduces the gain of the transistor 98 at high frequencies, is connected between the collector 104 and emitter 102 of the driver transistor 98. The output transistor 106 is of the N–P–N junction type and includes an emitter 110 and a collector 112, in addition to the base 108. The collector 104 of the driver transistor 98 is also connected to the base 120 of a second output transistor 118 through a pair of semiconductor junction diodes 114 and 116 which provide a temperature sensitive threshold bias for the output transistors 106 and 118. The output transistor 118 is of an opposite conductivity type to the output transistor 106. It is thus illustrated as being a P–N–P junction type transistor and includes an emitter 122 and a collector 124, in addition to the base 120.

The output transistors 106 and 118 are arranged, in accordance with the invention, for class B push-pull operation. This type of circuit is generally referred to as a complementary push-pull circuit. The transistors 106 and 118 are connected in series for direct-current. To this end, the collector 112 of the N–P–N transistor 106 is connected to ground through a small resistor 126, and the emitters of the output transistors, which are the output electrodes, are connected directly together. To supply a reverse collector bias for the P–N–P transistor 118 its collector 124 is connected to the negative supply terminal. Forward base-emitter bias for the transistor 118 is provided by connecting its base 120 through three resistors 128, 130, and 132 to the negative supply terminal. The resistor 130 is variable and provides a means of controlling vertical raster size (i.e. height). A capacitor 134 is connected from the emitters of the output transistors to the junction of the resistors 130 and 132 and provides signal feedback from the output to the low impedance input biasing network, thus providing a high dynamic input impedance and efficient signal transfer.

The emitters 110 and 122 of the output transistors are capacitively coupled through an output coupling capacitor 136 and the vertical yoke coil or winding 138 to ground.

The vertical deflection circuit embodying the invention includes several feedback circuits as follows:

(1) A positive feedback path is provided between the collector 112 of the output transistor 106 and the base 100 of the driver transistor 98. This path, which comprises a resistor 140 connected from the junction of the collector 112 and the resistor 126 to the base 100 of the driver transistor, provides essentially infinite gain for the driver and output stages during the latter portion of trace and is the first of three feedback paths which, in combination, provide integrator operation during trace.

(2) A direct-current conductive feedback path is provided from the emitters of the output transistors to the base 100 of the driver transistor 98. This path comprises three serially connected resistors 142, 144, and 146. This feedback path is also part of the novel integrator circuit and provides a control current for the base 100 of the driver transistor 98. The resistor 144 is variable and provides a means of adjusting the deflection waveform, particularly the gating interval. A capacitor 148 is connected from the junction of the resistors 142 and 144 to ground and provides filtering of the current which is fed back to the input of the driver transistor.

(3) The third feedback path for the integrator circuit comprises a capacitor 150 and the parallel combination of a resistor 152 and a capacitor 154 connected from the junction of the output coupling capacitor 136 and the yoke winding 138 to the base 100 of the driver transistor. This feedback circuit provides a current for the base 100 of the driver transistor 98 which is proportional to the time derivative of the output current.

(4) A feedback circuit is also provided from the junction of the output coupling capacitor 136 and the vertical coil 138 to the base 82 of the discharge transistor. This path, which includes a capacitor 156 and a resistor 158, provides a negative voltage at the base 82 of the discharge transistor 80 at the completion of trace and reduces the reverse bias of this transistor, thus permitting triggering of the discharge transistor by sync pulses.

(5) A final feedback path is provided from the junction of the collector 112 of the N–P–N output transistor 106 and the resistor 126 to the base of the discharge transistor 80. This feedback path includes a variable resistor 160, one terminal of which is grounded, and a series resistor 162. This feedback path also provides a negative voltage on the base of the discharge transistor 80 to reduce its reverse bias and insure proper triggering. The latter two feedback circuits insure proper triggering of the discharge transistor by sync pulses without the danger of false triggering by received noise signals.

In describing the operation of the vertical deflection circuit embodying the invention, reference will be jointly made to the circuit diagram of Figure 1 and the waveforms shown in Figure 2. In operation, the discharge transistor 80 is reverse biased and non-conductive during the trace portion of the vertical deflection cycle. This reverse bias voltage is mainly due to the charging of the capacitor 156 during previous cycles of operation and to a lesser extent the charging of the capacitors 72 and 74. These capacitors charge in a direction such that the base of the discharge transistor 80 is positive, which is reverse bias for the discharge transistor 80. The voltage on the base of the discharge transistor is indicated by the waveform 164. The driver transistor 98 is, during this portion of the operating cycle, forward biased and conductive. Current flows from the collector 104 of the driver transistor into the base electrodes 108 and 120 of the vertical output transistors 106 and 118, which are biased for class B push-pull operation. Thus, during the early portion of trace, while the driver current is relatively, low, the P–N–P transistor 118 is rendered conductive and the N–P–N transistor 106 is non-conductive. As driver current increases during the latter half of trace time, the N–P–N junction output transistor 106 is rendered conductive, while the P–N–P junction output transistor 118 is non-conductive. This is shown graphically by the waveforms 166 and 168, which represent the collector current and emitter current of the N–P–N and P–N–P output transistors 106 and 118, respectively. The resistor 126 which, in a typical example, may have a resistance value of 1.2 ohms, provides the return path for collector current flow of the N–P–N output transistor 106. The potential drop across the resistor 126 makes the voltage at the ungrounded terminal of this resistor increasingly negative as shown by the waveform 170. The potential across the variable resistor 160 also becomes increasingly negative. This increasing negative voltage is applied through the resistor 162 to the base electrode 82 of the discharge transistor 80. By varying the resistance of the resistor 160, the magnitude of this negative voltage may be varied as shown by the dotted portion of the waveform 170. This provides a variable hold control for the circuit. The application of this negative threshold voltage to the base of the discharge transistor 80 reduces the reverse bias of the discharge transistor 80 as will be described in more detail hereinafter.

The driver and output stages operate to integrate a control current which is applied to the input of the driver stage to provide an output current which is proportional to the time integral of the control current. This control current is supplied to the base 100 of the driver transistor 98 through the direct-current conductive feedback path including the three resistors 142, 144, and 146, which are connected between the emitters of the output transistors and the base of the driver transistor. This current is filtered by the capacitor 148.

A feedback circuit is also provided from the junction of the yoke coupling capacitor 136 and the vertical yoke coil 138 to the base 100 of the driver transistor 98. The time constant of this feedback circuit is selected to be very nearly equal to the time constant of the vertical yoke. This feedback circuit provides a current to the base 100 of the driver transistor 98 which is a time derivative of the vertical output current. A feedback current path is also provided through the resistor 140 to the base of the driver transistor. The feedback current in this path constitutes positive feedback to the driver transistor.

Thus, three feedback circuits are provided between the output and the input of the circuit comprising the driver and output stages. The positive feedback path including the resistor 140 provides essentially infinite gain during the latter portion of trace for the circuit comprising these two stages. The time constant feedback network provides a current to the input which is a time derivative of the output current. Accordingly, the application of a control current through the direct-current feedback circuit including the resistors 142, 144, and 146 produces an output or controlled current through the yoke winding 138 whose amplitude is proportional to the time integral of the control current. It is in this manner that integration of the control current is provided and the collector and emitter current of the N–P–N output transistor 106 and thus the output or yoke current increases in a linear manner as shown by the sawtooth current waveforms 166 and 172. This is the deflection trace current. It should be noted that during the initial period of trace, positive feedback is not provided, but the non-linearity thus produced is tolerable.

The yoke voltage is shown by the waveform 174. The voltage at the emitters of the output transistors (waveform 175 of Figure 2) and the yoke voltage become increasingly positive during trace. Eventually a point is reached at which the potential difference between the collector and emitter electrodes of the N–P–N output transistor 106 becomes nearly zero. Thus, collector bottoming occurs, that is, the transistor 106 runs out of collection volts. The voltage increase across the yoke is limited and correspondingly the waveform 177, derived from the yoke voltage through the capacitor 156, becomes a steep negative-going ramp. This negative-going voltage is applied through the feedback circuit including the resistor 158 to the base of the discharge transistor 80 and is used to gate the discharge transistor so it will be conductive upon the application of vertical sync pulses. This interval, about 200 microseconds, is the gating interval. The negative voltage across the hold control resistor 160 is also supplied to the base 82 of the discharge transistor 80. In addition, integrated negative going vertical synchronizing pulses 176 are applied to the base of the discharge transistor through the resistor 70. The net voltage at the base of the discharge transistor is the sum of the voltages provided by the two feedback circuits and the integrated vertical sync pulses and is shown by the waveform 164. The dotted line on the waveform 164 indicates the conduction threshold voltage for the discharge transistor. When the net voltage at the base 82 of the discharge transistor 80 exceeds the conduction threshold of the discharge transistor an overall positive feedback loop is completed and the retrace interval commences. It is to be noted that, by providing this type of gating action for the discharge transistor 80, noise immunity is provided. This is because noise pulses of an amplitude comparable to the amplitude of the sync pulses are of a value below the conduction threshold of the discharge transistor. Thus conduction of the discharge transistor is prevented until vertical sync pulses are applied to its base.

The rapid increase in current of the discharge transistor 80 rapidly and abruptly reduces current flow of the driver transistor 98. This rapid decrease in current flow of the driver transistor 98 is indicated by the waveform 178. The base voltage of the driver transistor 98 is shown by the waveform 180. The reduction in driver transistor current flow causes the N–P–N output transistor 106 to be reverse biased and non-conductive while the P–N–P output transistor 118 is forward biased and is rendered conductive. The yoke waveform 174, and the gating waveform 177 then abruptly go negative, maintaining the discharge transistor 80, in conduction. Current flow in the yoke coil 138 thus reverses as shown by the waveform 172. This provides vertical retrace of the kinescope electron beam and completes the vertical deflection cycle. The yoke current reaches a limiting negative value, as determined by the current available from the discharge of the capacitor 134 through the resistors 130 and 128 into the base of the transistor 118, and the rate of change of yoke current becomes zero. The yoke voltage rises sharply as indicated by the waveform 174 and the discharge transistor 80 is again reverse biased. The trace portion of the deflection cycle thus resumes.

The threshold control provided by means of the variable resistor 160, is adjusted so that the discharge transistor conducts heavily just at the moment the integrated vertical sync pulses 176 are applied to the base of the discharge transistor. In the absence of vertical synchronizing pulses, such as would be encountered if the receiver is tuned to an inactive television channel, the vertical deflection circuit becomes free running at a slightly slower rate. By varying the resistance of the resistor 144 the magnitude of the control current which is applied to the base of the driver transistor 98 is varied which influences both the raster height and the gating interval. The vertical size control variable resistor 130 varies the direct-current resistance in the return path for the current of the driver transistor 98. This, in effect, permits the yoke voltage waveform to be adjusted in size without changing the gating interval of the discharge transistor 80. The vertical size adjustment keeps the gating interval essentially constant.

The gating interval of the vertical deflection circuit is adjusted to be approximately 200 microseconds long so as not to interfere with picture content. This is possible because vertical blanking precedes the beginning of the vertical sync pulses by about 192 microseconds and conduction of the vertical discharge transistor 80 typically occurs approximately 100 microseconds after the beginning of the vertical sync pulses.

Since class B output is used, the vertical deflection circuit embodying the invention is extremely efficient (approaching 40 percent). In addition, very precise gating action is obtained by the positive feedback circuits from the output circuit to the input circuit of the discharge transistor. It is to be noted that the yoke voltage (waveform 174) increases linearly and then remains constant for a short period of time (typically 200 microseconds) when collector bottoming of the N–P–N output transistor 106 occurs. The voltage at the yoke then abruptly goes negative at the instant vertical sync pulses are applied to the discharge transistor. This negative voltage, together with the negative voltage developed across the hold control resistor and the negative going sync pulses, precisely control the conduction of the discharge transistor. Thus, the discharge transistor is conductive only upon application of the sync pulses and is immune to noise pulses during the trace interval. Accordingly, noise immunity is provided by the circuit embodying the invention.

It is to be further noted that the circuit embodying the invention does not employ inductors or transformers. Thus, the cost of the circuit is reduced and relatively small sized components may be used throughout the circuit. In addition, it has been found that circuit stability with variations in ambient temperature and supply voltage are excellent.

A circuit embodying the invention has been built and tested and has been used to obtain full ninety-degree deflection with a 14 inch kinescope. The following values for the various circuit components were used, by way of example:

| | |
|---|---|
| Resistors **56, 58 60,** and **62** | 1 meg; 6,800; 47,000; and 560 ohms, respectively. |
| Capacitors **64, 72,** and **74** | 0.1; 0.01; and 0.01 microfarad, respectively. |
| Resistor **70** | 27,000 ohms. |
| Resistors **88** and **92** | 3,300 and 8,200 ohms, respectively. |
| Resistors **93** and **94** | 39 and 470,000 ohms, respectively. |
| Capacitor **96** | 0.2 microfarad at 12 volts. |
| Capacitor **105** | 0.005 microfarad. |
| Resistors **128, 130,** and **132** | 330; 500; and 82 ohms, respectively. |
| Resistors **140, 142, 144** and **146** | 2,700; 1,200; 2,500; and 6,800 ohms, respectively. |
| Capacitors **134, 136,** and **148** | 160/6 v.; 500/2 v.; and 16/12 v., microfarads, respectively. |
| Capacitors **150** and **154** | 2.0 and 0.001 microfarads, respectively. |
| Resistor **152** | 470 ohms. |
| Capacitor **156** | 0.02 microfarad. |
| Resistor **158** | 4700 ohms. |
| Resistors **126, 160,** and **162** | 1.2; 250; and 6,800 ohms, respectively. |
| Vertical yoke winding **138** | 4.2 millihenries, 4.5 ohms. |
| Supply voltage | −12 volts. |

What is claimed is:

1. In a television receiver including a kinescope having a vertical deflection winding, a vertical deflection circuit comprising, in combination, a transistor class B complementary symmetry push-pull circuit coupled with said deflection winding, synchronizing signal responsive means connected with said push-pull circuit, means for applying a control current to said signal responsive means, and means providing connections for said signal responsive means and said push-pull circuit to integrate said control current and provide a linear increase in current flow through said deflection winding during the trace portion of the deflection cycle.

2. In a television receiver including a kinescope having a vertical deflection winding, a vertical deflection circuit comprising, in combination, a transistor class B push-pull complementary symmetry circuit coupled with said winding and connected to provide a substantially linear increase in current flow through said deflection winding during the trace portion of the deflection cycle and a reverse voltage of relatively large amplitude upon completion of said trace portion, means controlling the current conducting condition of said push-pull circuit including a discharge transistor biased in the reverse non-conducting direction during said trace portion, means for applying synchronizing pulses to said discharge transistor, and means for applying said reverse voltage to said discharge transistor upon application of said synchronizing pulses to render said discharge transistor conductive during the retrace portion of said deflection cycle.

3. A deflection circuit for deflecting the electron beam of a television receiver kinescope having a deflection winding comprising, in combination, an output stage including a pair of opposite conductivity transistors connected for class B push-pull operation and coupled with said winding for supplying deflection current thereto, means for deriving a gating voltage from said output stage transistors, a discharge transistor connected in said deflection circuit to provide variation in the current conducting condition of said pair of transistors in response to synchronizing signals, means for applying said gating voltage to said discharge transistor, and means including said gating voltage for rendering said discharge transistor conductive and for completing a positive feedback path in said deflection circuit during the retrace portion of the deflection cycle.

4. A vertical deflection circuit for deflecting the electron beam of a television receiver kinescope having a deflection winding comprising, in combination, an output stage comprising a first transistor of one conductivity type and a second transistor of an opposite conductivity type connected for class B push-pull operation, means providing an output circuit for said transistors including said deflection winding, a driver stage including a third transistor of said opposite conductivity type connected to conduct current during the trace portion of the vertical deflection cycle of said receiver, vertical synchronizing signal responsive means connected with said third transistor to decrease current flow thereof during the retrace portion of the vertical deflection cycle in response to synchronizing signals, and means connecting said third transistor with said first and second transistors to provide integrator operation and a linear increase in current flow through said deflection winding during the trace portion of the deflection cycle.

5. A vertical deflection circuit for deflecting the electron beam of a television receiver kinescope having a vertical deflection winding comprising, in combination, an output stage comprising a first transistor of one conductivity type and a second transistor of an opposite conductivity type connected for class B push-pull operation, means providing an output circuit for said transistors including said deflection winding, a driver stage including a third transistor of said opposite conductivity type connected to conduct current during the trace portion of the vertical deflection cycle of said receiver, vertical synchronizing signal responsive means connected with said third transistor, means for applying synchronizing pulses to said signal responsive means, means for deriving a voltage from said output stage and for applying said voltage to said signal responsive means, said signal responsive means being conductive upon application of said synchronizing pulses and said voltage to render said third transistor non-conductive during the retrace portion of the deflection cycle, means connecting said third transistor with said first and second transistors to provide driving current therefor, means providing a positive feedback circuit connected between said second and third transistors to increase the gain of said circuit, means for deriving a control current from said first and second transistors and for applying said control current to said third transistor, and means for deriving a controlling current proportional to the time derivative of current flow in said output circuit and for applying said controlling current to said third transistor.

6. In a television receiver including a kinescope having a vertical deflection winding, a vertical deflection circuit comprising, in combination, a class B push-pull output circuit comprising a pair of transistors of opposite conductivity types connected for common collector operation and with said winding to provide a substantially linear increase of current flow therethrough and an increasing voltage of one polarity thereacross during the trace portion of the deflection cycle, said voltage being limited upon completion of said trace portion to provide a voltage of an opposite polarity, a discharge transistor biased in the reverse non-conducting direction during said trace portion, means for applying synchronizing pulses to said discharge transistor, and means for applying said voltage of opposite polarity to said discharge transistor upon application of said synchronizing pulses to render said discharge transistor conductive during the retrace portion of said deflection cycle.

7. A deflection circuit for deflecting the electron beam of a television receiver kinescope having a deflection winding comprising, in combination, an output stage including at least one transistor of one conductivity type coupled with said deflection winding for supplying deflection current thereto, a driver transistor of an opposite conductivity type connected with said one transistor to provide integration of a control current which is applied to said driver transistor, a regenerative feedback circuit coupling said one transistor with said driver transistor to increase the gain of said circuit, and means for applying a current to said driver transistor which is proportional to the time derivative of said deflection current.

8. A vertical deflection circuit for deflecting the electron beam of a television receiver kinescope having a vertical deflection winding comprising, in combination, a push-pull output stage including a first transistor of one conductivity type and a second transistor of an opposite conductivity type connected with said winding for class B push-pull operation, a driver transistor biased for conduction during the trace portion of the deflection cycle and connected with said first and second transistors, a discharge transistor biased for non-conduction during said trace portion and connected with said driver transistor, means providing voltage feedback from said output stage to said discharge transistor during the retrace portion of the deflection cycle of a polarity to apply a forward bias thereto upon application of vertical synchronizing pulses to render said discharge transistor conductive, and feedback means providing integration of a control current applied to said driver transistor to provide a substantially linear increase of current flow through said deflection winding during the trace portion of said deflection cycle.

9. A deflection circuit for deflecting the electron beam of a television receiver kinescope having a deflection winding comprising, in combination, an output stage including a pair of opposite conductivity transistors connected for class B push-pull operation and coupled with said winding for supplying deflection current thereto, driving means connected for applying driving signals to said pair of transistors, a synchronizing signal responsive discharge transistor connected with said driving means, means providing a forward bias for said discharge transistor during the retrace portion of the deflection cycle of said receiver including a feedback circuit connected between said output stage and said discharge transistor, and means for applying synchronizing signals to said discharge transistor to render said discharge transistor conductive during the retrace portion of the deflection cycle of said receiver and to alter the current conducting condition of said driving means.

10. A deflection circuit for deflecting the electron beam of a television receiver kinescope having a deflection winding comprising, in combination, an output stage including at least one transistor of one conductivity type coupled with said deflection winding for supplying deflection current thereto, a driver transistor of an opposite conductivity type connected with said one transistor and biased for maximum conduction during the trace portion of the deflection cycle, means for applying a control current to said driver transistor, means providing integration of said control current including a regenerative feedback circuit coupling said one transistor with said driver transistor to increase the gain of said circuit, and means for applying a current to said driver transistor which is proportional to the time derivative of said deflection current.

11. In a television receiver including a kinescope having a vertical deflection winding, a vertical deflection circuit for deflecting the electron beam of said kinescope comprising, in combination, an output stage including a first transistor of one conductivity type and a second transistor of an opposite conductivity type each including base, emitter, and collector electrodes and connected for class B push-pull operation, means directly connecting the emitter of said first transistor with the emitter of said second transistor, means including a capacitor connecting said emitter electrodes with said deflection winding, a normally conducting driver transistor of said one conductivity type connected for common emitter operation and including base, emitter, and collector electrodes, means direct current conductively connecting the collector of said driver transistor with the base electrodes of said first and second transistors, a discharge transistor of said one conductivity type connected for common emitter operation and including base, emitter, and collector electrodes, means direct current conductively connecting the collector of said discharge transistor with the base of said driver transistor, means providing a forward bias for said discharge transistor including a first feedback circuit connected from the junction of said capacitor and said deflection winding to the base electrode of said discharge transistor and a second feedback circuit connected from the collector of said second transistor to the base of said driver transistor, means for applying vertical synchronizing pulses to the base electrode of said discharge transistor to render with the forward bias voltage provided by said first and second feedback circuits said discharge transistor conductive, means providing a control current for said driver transistor including a third feedback circuit connected between the emitter of said second transistor and the base of said driver transistor, means providing a fourth feedback circuit connected from the collector of said second transistor to the base of said driver transistor to provide positive feedback and relatively high gain circuit operation, and means providing integration of said control current including a fifth feedback circuit connected from the junction of said capacitor and said deflection winding to the base of said driver transistor to provide a substantially linear increase of current flow through said deflection winding during the trace portion of the deflection cycle.

12. A deflection circuit for deflecting the electron beam of a television receiver kinescope having a deflection winding comprising, in combination, an output stage including a pair of opposite conductivity transistors connected for class B push-pull operation and coupled with said winding for supplying deflection current thereto, a synchronizing signal responsive discharge transistor, said discharge transistor being non-conductive in the absence of synchronizing signals, means for applying synchronizing signals to said discharge transistor to provide synchronization thereof and for varying the current conducting condition of said pair of transistors, and means for applying a feedback voltage from said output stage to said discharge transistor upon application of said synchronizing signals to render said discharge transistor conductive during the retrace portion of the deflection cycle.

13. A deflection circuit for deflecting the electron beam of a television receiver kinescope having a deflection winding comprising, in combination, a class B output stage including a pair of transistors of opposite conductivity types coupled with said deflection winding for supplying deflection current thereto, a driver transistor connected with said pair of transistors to provide integration of a control current which is applied to said driver transistor including a regenerative feedback circuit coupled between said pair of transistors and said driver transistor to increase the gain of said circuit, and means for applying a current to said driver transistor which is proportional to the time derivative of said deflection current.

14. In a television receiver including a kinescope having a vertical deflection winding, a vertical deflection circuit comprising, in combination, a class B push-pull output circuit comprising a pair of opposite conductivity type transistors connected with said deflection winding for common collector operation, a common emitter driver transistor responsive to the application of synchronizing signals to said deflection circuit and connected with said pair of transistors, means for deriving a control current from said output circuit, means for applying said control current to said driver transistor, and means connecting said driver transistor and said pair of transistors to provide integration of said control current and a linear increase in current flow through said deflection winding during the trace portion of the deflection cycle.

15. A vertical deflection circuit for deflecting the electron beam of a television receiver kinescope having a vertical deflection winding comprising, in combination, an output stage comprising a first transistor of one conductivity type and a second transistor of an opposite conductivity type connected for class B common collector push-pull operation, means providing an output circuit for said transistors including said deflection winding, a driver stage including a third transistor of said opposite conductivity type connected for common emitter operation and biased to conduct current during the trace portion of the vertical deflection cycle of said receiver, vertical synchronizing signal responsive means connected with said third transistor to decrease current flow thereof during the retrace portion of the vertical deflection cycle, means connecting said third transistor with said first and second transistors to provide driving current therefor, means providing a positive feedback circuit connected between said second and third transistors to increase the gain of said circuit, means for deriving a control current from first and second transistors, means for applying said control current to said third transistor, means for deriving a controlling current proportional to the time derivative of current flow in said output circuit, and means for applying said controlling current to said third transistor to provide current flow in said output circuit which is a time integral of said control current.

16. A vertical deflection circuit for deflecting the electron beam of a television receiver kinescope having a vertical deflection winding comprising, in combination, an output stage including a first transistor of one conductivity type and a second transistor of an opposite conductivity type each including base, emitter, and collector electrodes and connected for class B push-pull operation, means connecting the emitter of said first transistor with the emitter of said second transistor, means including a capacitor connecting said emitter electrodes with said deflection winding, a normally conducting driver transistor of said one conductivity type connected for common emitter operation and including base, emitter, and collector electrodes, means connecting the collector of said driver transistor with the base electrodes of said first and second transistors, a discharge transistor of said one conductivity type including base, emitter, and collector electrodes, means connecting the collector of said discharge transistor with the base of said driver transistor, means providing a feedback circuit from said output stage to the base electrode of said discharge transistor to apply a feedback voltage thereto of a polarity to forward bias said discharge transistor, means for applying vertical synchronizing pulses to the base electrode of said discharge transistor of the same polarity as said feedback voltage to render said discharge transistor conductive, means providing a control current for said driver transistor, and means providing integration of said control current including a feedback circuit connected from the junction of said capacitor and said deflection winding to the base of said driver transistor to provide a substantially linear increase of current flow through said deflection winding during the trace portion of the deflection cycle.

17. A deflection circuit for deflecting the electron beam of a television receiver kinescope having a deflection winding comprising, in combination, a class B push-pull output stage coupled with said deflection winding for supplying deflection current thereto, a driver transistor connected with said output stage to provide integration of a control current which is applied to said driver transistor including a regenerative feedback circuit coupling said output stage with said driver transistor to increase the gain of said circuit, means for deriving a current from said output stage which is proportional to the time derivative of said deflection current, and means for applying said derived current to said driver transistor.

18. A deflection circuit for deflecting the electron beam of a television receiver kinescope having a deflection winding comprising, in combination, an output stage including a pair of opposite conductivity transistors connected for class B push-pull operation and coupled with said winding for supplying deflection current thereto, means including a synchronizing signal responsive discharge transistor for supplying input signals to said pair of transistors, means for reverse biasing said discharge transistor during the trace portion of the deflection cycle, means for applying synchronizing pulses to said discharge transistor during the retrace portion of the deflection cycle of said receiver, and means including said synchronizing pulses and a feedback circuit connected between said output stage and said discharge transistor to render said discharge transistor conductive during the retrace portion of said deflection cycle.

19. A vertical deflection circuit for deflecting the electron beam of a television receiver kinescope having a vertical deflection winding comprising, in combination, an output stage comprising a first transistor of one conductivity type and a second transistor of an opposite conductivity type connected for class B push-pull operation, means providing an output circuit for said transistors including said deflection winding, a driver stage including a third transistor of said opposite conductivity type connected to conduct current during the trace portion of the vertical deflection cycle of said receiver, vertical synchronizing signal responsive means connected with said third transistor to decrease current flow thereof during the retrace portion of the vertical deflection cycle, means connecting said third transistor with said first and second transistors to provide driving current therefor, means for applying a positive feedback signal from said second transistor to said third transistor, means for applying a control current to said third transistor, means for deriving a controlling current proportional to the time derivative of current flow in said output circuit, and means for applying said controlling current to said third transistor to provide current flow in said output circuit which is a time integral of said control current.

20. A vertical deflection circuit for deflecting the electron beam of a television receiver kinescope having a vertical deflection winding comprising, in combination, an output stage including a first transistor of one conductivity type and a second transistor of an opposite conductivity type each including base, emitter, and collector electrodes and connected for class B push-pull operation, means connecting the emitter of said first transistor with the emitter of said second transistor, means coupling said emitter electrodes with said deflection winding, a driver transistor of said one conductivity type connected for common emitter operation and including base, emitter, and collector electrodes, means connecting the collector of said driver transistor with the base electrodes of said first and second transistors, a discharge transistor of said one conductivity type including base, emitter, and collector electrodes, means connecting the collector of said discharge transistor with the base of said driver transistor, means providing feedback from said output stage to the base electrode of said discharge transistor to apply a feedback voltage thereto of a polarity to forward bias said discharge transistor upon application of vertical synchronizing pulses to the base electrode of said discharge transistor to said discharge transistor conductive, and means providing integration of a control current applied to said driver transistor including means providing feedback from said output stage to the base of said driver transistor to provide a substantially linear increase of current flow through said deflection winding during the trace portion of the deflection cycle.

21. In a television receiver, a vertical deflection circuit including a deflection winding, means for applying a vertical synchronizing pulse to said deflection circuit during a predetermined interval of time, an output stage connected with said deflection winding for supplying a deflection wave having a trace and a retrace portion thereto, means responsive to the current conducting condition of said output stage for deriving a gating signal prior to the completion of said interval of time, and means for utilizing said gating signal to initiate the retrace portion of the vertical deflection cycle of said receiver.

References Cited in the file of this patent

UNITED STATES PATENTS

| | | |
|---|---|---|
| 2,789,164 | Stanley | Apr. 16, 1957 |
| 2,847,519 | Aronson | Aug. 12, 1958 |

FOREIGN PATENTS

| | | |
|---|---|---|
| 766,744 | Great Britain | Jan. 23, 1957 |

OTHER REFERENCES

Holmes et al.: "A Developmental Pocket-Size Broadcast Receiver Employing Transistors," Proceedings of The I.R.E., June 1955, pages 662 to 670.

McKinley et al.: "Transistor Amplifier for Medical Recording," Electronics, August 1, 1957, pages 161 to 163.

Herscher: "A-F Power Amplifiers," Electronics, April 11, 1958, pages 96 to 99.